US012083857B2

(12) United States Patent
Ostwald

(10) Patent No.: US 12,083,857 B2
(45) Date of Patent: Sep. 10, 2024

(54) AIR DUCT DEVICE AND MOTOR VEHICLE

(71) Applicant: Volkswagen Aktiengesellschaft, Wolfsburg (DE)

(72) Inventor: Stefan Ostwald, Soehlde (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 310 days.

(21) Appl. No.: 17/522,598

(22) Filed: Nov. 9, 2021

(65) Prior Publication Data
US 2022/0063370 A1    Mar. 3, 2022

Related U.S. Application Data

(63) Continuation of application No. PCT/EP2020/062263, filed on May 4, 2020.

(30) Foreign Application Priority Data

May 10, 2019  (DE) ...................... 10 2019 206 852.9

(51) Int. Cl.
*H02G 3/04*     (2006.01)
*B60H 1/00*     (2006.01)

(52) U.S. Cl.
CPC .................... *B60H 1/00564* (2013.01); *B60H 2001/00635* (2013.01)

(58) Field of Classification Search
CPC .. H02G 3/0418; F16L 9/17; F16L 9/22; F16L 9/003
USPC .......... 138/162, 157, 166, 92; 174/101, 68.3
See application file for complete search history.

(56) References Cited

U.S. PATENT DOCUMENTS

| 2,867,681 | A | * | 1/1959 | Alwin .................... | H02G 3/045 |
| | | | | | 174/101 |
| 3,757,031 | A | * | 9/1973 | Izraeli .................. | H02G 15/113 |
| | | | | | 138/155 |
| 4,891,471 | A | * | 1/1990 | Ono ....................... | H02G 3/0608 |
| | | | | | 174/101 |
| 4,951,716 | A | * | 8/1990 | Tsunoda ............... | H02G 3/0418 |
| | | | | | 174/101 |
| 4,989,347 | A | * | 2/1991 | Kretchman ............. | D06F 58/04 |
| | | | | | 34/607 |

(Continued)

FOREIGN PATENT DOCUMENTS

| CN | 102476435 A | 5/2012 |
| CN | 102997391 A | 3/2013 |

(Continued)

OTHER PUBLICATIONS

International Search Report dated Sep. 1, 2020 in corresponding application PCT/EP2020/062263.

*Primary Examiner* — Patrick F Brinson
(74) *Attorney, Agent, or Firm* — Muncy, Geissler, Olds & Lowe, P.C.

(57) ABSTRACT

An air duct device for a vehicle, in particular a motor vehicle, with a tubular air duct having an outer wall that is closed in cross-section, and with at least one elastically deformable latch associated with the air duct. Provision is made that the air duct is designed in at least two parts in cross-section and for this purpose has a first duct element and a second duct element, which are held against one another in a sealing manner by the at least one latch such that together they form the closed outer wall of the air duct.

12 Claims, 2 Drawing Sheets

(56) References Cited

U.S. PATENT DOCUMENTS

| | | | |
|---|---|---|---|
| 5,066,050 A * | 11/1991 | Kretchman | D06F 58/04 |
| | | | 34/235 |
| 5,134,250 A * | 7/1992 | Caveney | H02G 3/0418 |
| | | | 174/101 |
| 5,399,812 A * | 3/1995 | Woszczyna | B60R 16/0215 |
| | | | 174/99 R |
| 5,709,249 A * | 1/1998 | Okada | H02G 3/0418 |
| | | | 174/101 |
| 6,367,503 B1 | 4/2002 | Keller et al. | |
| 6,502,897 B2 | 1/2003 | Neuss et al. | |
| 6,863,340 B2 | 3/2005 | Kawahigashi | |
| 7,038,133 B2 * | 5/2006 | Arai | H02G 3/0418 |
| | | | 174/99 R |
| 7,307,217 B2 * | 12/2007 | Daito | H02G 3/0418 |
| | | | 138/158 |
| 7,612,286 B2 * | 11/2009 | Lipp | B60R 16/0215 |
| | | | 174/101 |
| 10,451,200 B2 * | 10/2019 | Morton | F16B 21/06 |
| 2015/0011146 A1 | 1/2015 | Deck | |
| 2015/0210054 A1 | 7/2015 | Poiret | |

FOREIGN PATENT DOCUMENTS

| | | |
|---|---|---|
| CN | 104960137 A | 10/2015 |
| CN | 109398037 A | 3/2019 |
| DE | 3708648 A1 | 9/1988 |
| DE | 9016703 U1 | 2/1991 |
| DE | 9314178 U1 | 11/1993 |
| DE | 19852123 A1 | 5/2000 |
| DE | 10044379 A1 | 4/2002 |
| DE | 102005025082 A1 | 12/2006 |
| DE | 102006021386 A1 | 11/2007 |
| DE | 102006054847 A1 | 5/2008 |
| DE | 102012203351 A1 | 9/2013 |
| EP | 1334864 A1 | 8/2003 |
| EP | 0994768 B1 | 11/2005 |
| JP | H11198681 A | 7/1999 |
| WO | WO2016004522 A1 | 1/2016 |

* cited by examiner

AIR DUCT DEVICE AND MOTOR VEHICLE

This nonprovisional application is a continuation of International Application No. PCT/EP2020/062263, which was filed on May 4, 2020, and which claims priority to German Patent Application No. 10 2019 206 852.9, which was filed in Germany on May 10, 2019, and which are both herein incorporated by reference.

BACKGROUND OF THE INVENTION

Field of the Invention

The present invention relates to an air duct device for a vehicle, in particular a motor vehicle, with a tubular air duct having an outer wall that is closed in cross-section, at least in longitudinal sections, and with at least one elastically deformable latch associated with the air duct. In addition, the invention relates to a motor vehicle having the air duct device.

Description of the Background Art

Air duct devices of the abovementioned type are already known from the prior art. Thus, for example, utility model specification DE 90 16 703 U1 discloses an air duct device with multiple tubular air ducts, each of which has an outer wall that is closed in cross-section. On at least one of the air ducts, a latch intended to permit latching of the tube to a support or the like is located on the outer wall as a single part therewith.

Furthermore, from the patent specification DE 198 52 123 A1, a molded polymer part is known that, due to the use of a gas injection technique, has cavities that serve to conduct gases and fluids. Furthermore, from the patent specification DE 93 14 178 U1, an air flap is known with a body and with an elastic sealing strip molded onto the body, wherein the sealing strip has at least one hollow body running in the direction of extent thereof and produced by the gas injection process.

SUMMARY OF THE INVENTION

It is therefore an object of the present invention to provide an air duct device that ensures easy installation as well as a long service life.

The object underlying the invention is attained by an air duct device that has the advantage that installation, in particular in the motor vehicle, is facilitated, and furthermore space-saving integration of the air duct into the motor vehicle is ensured. Moreover, the air duct device according to the invention ensures durable and reliable air channeling, which reliably prevents air from emerging radially from the air duct, in particular. According to the invention, provision is made to this end that the air duct is designed in at least two parts in cross-section and for this purpose has a first duct element and a second duct element, which are held against one another in a sealing manner by the at least one latch such that together they form the closed outer wall of the air duct. The two-part design of the air duct in cross-section has the result that the air duct does not have a continuous, one-piece outer wall in cross-section, but instead has a divided outer wall that is formed by the at least two duct elements. The individual duct elements can thus be realized especially cost-effectively, because it is possible to dispense with the production of a hollow body for the air duct itself. This results in cost-effective and simple design and manufacture of the air duct device. The at least one latch achieves the result that the duct elements are held tightly together in the assembled state so that the outer wall remains permanently closed or tightly closed when viewed in circumference and, on the other hand, simple assembly of the duct elements with one another is made possible. Owing to the at least one latch, the duct elements latch together so that there is no need for additional fasteners and/or provisions, and the installation of the air duct is accomplished especially easily.

At least one of the duct elements has a receiving recess, into which is inserted a connecting projection of the other of the duct elements. Owing to the connecting projection inserted into the receiving recess, a tight connection of the duct elements to one another is ensured in a simple manner in order to form the closed outer wall. The connecting projection that is inserted into the receiving recess makes it possible that a labyrinth seal is produced on both outer longitudinal sides of the connecting projection owing to the sealing contact on both sides in the receiving recess. As a result, an especially tight design of the air duct is ensured. Moreover, the connecting projection to be inserted into the receiving recess permits easy alignment and association of the duct elements during installation. Preferably, the connecting projection and/or receiving recess are designed such that they serve as centering component for alignment of the duct elements with one another, by which means an advantageous joining of the duct elements to one another is ensured.

In addition, provision is preferably made that the first and/or the second duct element each have, in cross-section, a base wall and two side walls spaced apart from one another and projecting from the base wall, wherein each of the side walls has, on its free face, either a receiving recess or a connecting projection. As a result, the duct elements are advantageously joined to one another at their side walls by the means that the relevant connecting projection is inserted into an associated receiving recess of the opposite duct element. A simple off-tool design of the duct elements as well as an advantageous embodiment of the air duct itself is provided as a result of the formation of receiving recess and/or connecting projection in the free faces, because the fasteners, in particular, do not project into the air duct and as a result do not affect the air flow through the air duct. Instead, the duct elements are designed such that the interior of the air duct has a continuous inner wall with no projections that protrude radially inward in the assembled state, so turbulence and flow resistance are avoided in the air duct.

Preferably the side walls each have a receiving recess for receiving at least one connecting projection of a side wall of the opposite duct element. Thus, each side wall is equipped with a receiving recess, by which means an advantageous interchangeability of the duct elements is provided. Because the two side walls each have a receiving recess, an increased sealing effect between the duct elements is additionally achieved on account of the multiple sealing points between the duct elements thus created, as already described above. In particular, a tongue and groove connection, which offers high mechanical strength as well as an advantageous sealing effect for the air duct, is realized by this means.

The side walls can each be forked in design, with two connecting projections arranged at least essentially parallel to one another, wherein each pair of connecting projections forms a receiving recess between them. According to this embodiment, the side walls thus branch in a forked manner into two connecting projections each, which in turn form a receiving recess between them for the connecting projection of an opposing duct element. It is achieved in a simple manner through this embodiment that each duct element has both receiving recesses and connecting projections on its faces, wherein the side walls of the duct elements are designed to be complementary to one another in such a manner that easy mating or insertion of one connecting projection into one of the respective opposite receiving recesses is ensured in each case. As a result, the robustness of the air duct device, among other qualities, is also improved by an advantageous mechanical connection.

In addition, provision is preferably made that at least one of the connecting projections has a laterally projecting latching lug, and that a connecting projection of the opposite duct element associated with this connecting projection has a latching recess that interacts with the latching lug, wherein the latching lug and latching recess together form at least one latch. The latch is therefore arranged or formed in the region of the side walls, and permits direct latching of the first duct element to the second duct element. By means of the laterally projecting latching lug and the latching recess in the opposite duct element, the result is achieved that the two duct elements can be joined together under elastic deformation until the latching lug enters the latching recess, and thereby interlocks with the opposite duct element and ensures a positive locking of the duct elements to one another. Advantageous, easy installation that reliably prevents unwanted detachment of the duct elements from one another is provided as a result.

Preferably, the latching lug and latching projection are arranged and formed on an exterior of the air duct so that the interior of the air duct is free of projections or flow resistance, as already mentioned above. Furthermore, the exterior arrangement offers the advantage that the duct elements can also be detached from one another easily by releasing the latching if necessary.

At least one of the duct elements can have an internal fluid injection pressure passage, in particular internal gas injection pressure passage, in a branching region of at least one of the side walls into the associated connecting projections, which passage extends, in particular, parallel to the air duct. Owing to the formation of the side walls with two connecting projections each, a branching region is produced in which the side wall transitions from a one-armed formation into a two-armed formation. The advantageous internal fluid injection pressure passage is now provided in this branching region, ensuring that sink marks, which could result in distortion or potential positional/shape inaccuracy, are avoided in the manufacture of the duct elements. In particular, the relevant duct element is produced from plastic as an injection-molded part. During cooling of the plastic material, a shrinkage process takes place in which sink marks could theoretically occur. The provision of the advantageous internal fluid injection pressure passage in the respective branching region ensures that these sink marks do not occur in the critical region, so that low-distortion and dimensionally stable duct elements are available that ensure the advantageous sealing and alignment of the ducts with one another.

Furthermore, each duct element preferably has an internal fluid injection pressure passage, in particular internal gas injection pressure passage, in each branching region. It is ensured by this means that the duct elements are advantageously protected from distortion at all critical points, as described above.

Especially preferably, the connecting projections and/or receiving recesses each have a V-shaped end for tight contact with the opposite duct element. As a result of the V-shaped end, firstly a centering function is accomplished, and secondly extensive contact with the respective other duct element is ensured, thus achieving the advantage of a great sealing effect.

The first duct element or the second duct element can be designed as a support member of an instrument panel of a motor vehicle. As a result, the air duct is at least partially integrated into other components of the motor vehicle. Thus, the air duct is first completed by the addition of the other duct element, by which means easy installation and integration of the air duct, in particular into an instrument panel, is ensured.

Also, a motor vehicle is provided that includes at least one air duct device according to the invention. The aforementioned advantages arise as a result.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
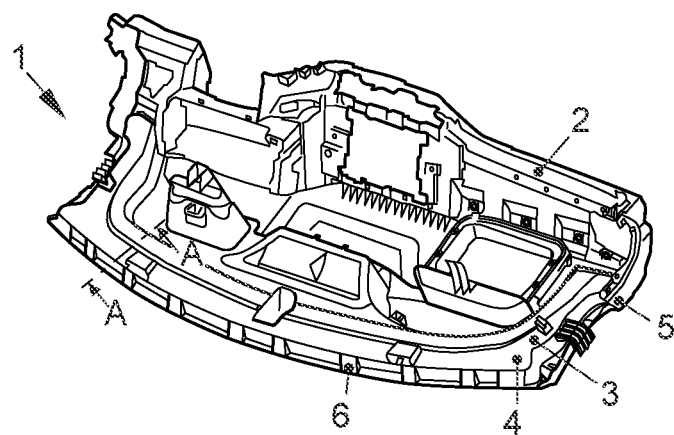
FIG. 1 is an advantageous exemplary embodiment of an advantageous air duct device in a perspective representation.

In a simplified perspective representation, FIG. 1 shows an air duct device 1 for a motor vehicle. The air duct device 1 has a support member 2 for an instrument panel of the motor vehicle. Arranged on the support member 2 is an air duct 3, which carries an air flow provided by a ventilating device or air-conditioning device, for example, selectively into the interior of the motor vehicle or to air vents in the region of the instrument panel. The air duct 3 is tubular in design and for this purpose has an outer wall that is closed in cross-section, at least in longitudinal sections, and that if applicable is pierced by air inlet and outlet openings only in sections, viewed in the longitudinal extent of the air duct 3. In cross-section, the outer wall 4, in particular in the present exemplary embodiment, has a rectangular cross-section so that a rectangular interior is produced that serves for air conduction.

The air duct 3 is designed in two parts in this case. For this purpose, the support member 2 forms a first duct element 5, on which a second duct element 6, which is formed separately from the support member 2 and, in particular is detachably attached thereto, is placed. The duct elements both extend in the longitudinal extent of the air duct 3 in this design, so that the air duct 3 viewed in cross-section is split into two parts, as is discussed in detail below.

Figure 2:
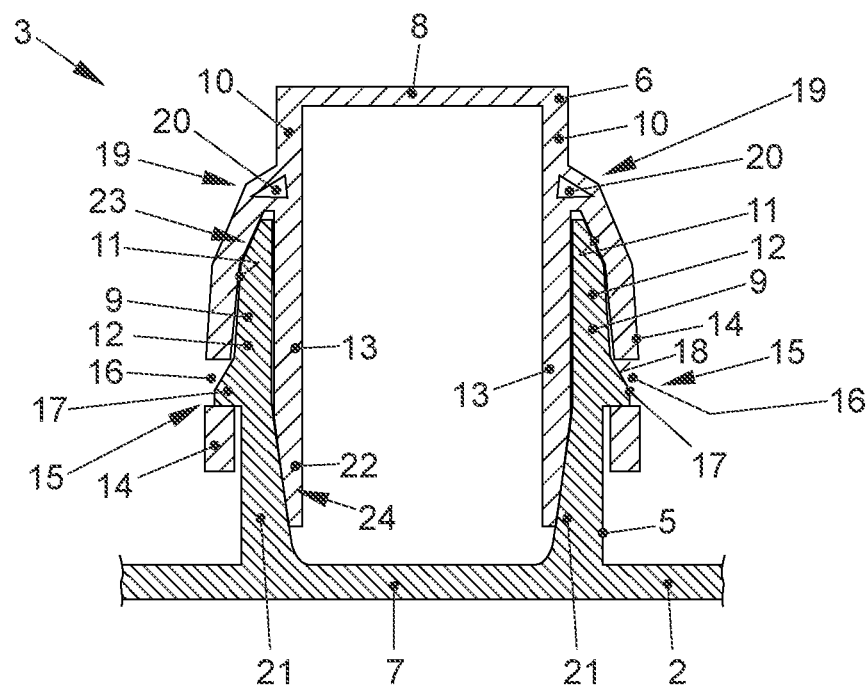
FIG. 2 is a cross-sectional representation of an air duct of the air duct device.

In this regard, FIG. 2 shows a simplified cross-sectional representation through the air duct 3 of the air duct device 1 along the dashed line A-A drawn in FIG. 1. Both duct elements 5, 6 have a cup-shaped cross-section. To this end, each of the duct elements 5, 6 has a base wall 7 or 8, as well as two side walls 9 and 10 respectively, projecting from the relevant base wall 7, 8 and arranged apart from one another. The side walls 9, 10 each project from the same side of the associated base wall 7, 8 so that the aforementioned cup shape is produced in cross-section of the duct elements 5, 6.

In accordance with the present exemplary embodiment, the second duct element 8 has a receiving recess 11 formed in the free face of the relevant side wall 10. The relevant receiving recess 11 is designed to be V-shaped in the base or end region of the relevant receiving recess 11. The receiving recesses 11 serve to receive the side walls 9 of the opposite duct element 5 so that the side walls 9 of the duct element 5 form, at least at the end, a connecting projection 12 that can be inserted or is inserted into the relevant receiving recess 11. Preferably, as shown in FIG. 2, the connecting projections 12 likewise have a V-shape at their free end that is inserted into the relevant receiving recess 11 in order to ensure an advantageous, sealing mating contact of the side walls 9 and 10 with one another. In particular, the width of the relevant connecting projection 12 is slightly larger than the clear opening of the receiving recess, at least in sections, in the V-shaped region so that a press fit at the contact surfaces is achieved by the insertion of the connecting projections 12 into the relevant receiving recess 11.

The receiving recess 11 of the duct element 6 is created by the means that sections of the side walls 10 branch geometrically into two connecting projections 13, 14 oriented at least essentially parallel to one another, wherein the receiving recess 11 is formed between the relevant connecting projections 13, 14. The relevant inside connecting projection 13 in this case constitutes an inner wall of the air duct 3 and the relevant outside connecting projection 14 constitutes a latch 15 for latching of the duct element 6 to the duct element 5.

For this purpose, the outside connecting projection 14 has a latching recess 16 in the form of an opening or a recess facing the receiving recess 11. The side walls 9 of the opposite duct element 5, or the connecting projections 12, each have a latching lug 17 that interacts with the latching recess. The latching lugs 17 each project outward, which is to say in the direction of the outside connecting projection 14. In this case the latching lugs 17 have an inclined stop face 18, which strikes against the face of the connecting projection 14 during insertion and forces the projection outward with elastic deformation of the connecting projection 14, in particular, until it snaps into the latching recess 16, thereby locking the duct elements 5 and 6 to one another.

Formed in each branching region 19 where the side wall 10 is divided into the two connecting projections 13, 14 in a forked manner is an internal fluid injection pressure passage 20, which is to say a cavity, which was produced by an internal fluid injection pressure process, or alternatively by an internal liquid injection pressure process. The internal fluid injection pressure passage 20 extends parallel to the air duct 3, or in its longitudinal extent, in the branching region 19. According to the present exemplary embodiment, it is designed to be triangular in this case so that the material of the duct element 6 surrounding it in cross-section has virtually the same thickness over the entire perimeter of the internal gas injection pressure passage 20, as shown in FIG. 2. Preferably the connecting projections 13 extend at right angles to the base wall 8, while the connecting projections 14 are initially routed diagonally outward from the side wall 10 or the branching region 19 and then essentially parallel to the connecting projection 13.

It is ensured by means of the internal fluid injection pressure passage 20 that the occurrence of sink marks and the attendant distortion of the duct element 6 is avoided in the region of high stresses, which should also be precise and capable of long-term loading for a reliable sealing contact between the duct elements 5, 6. In this way, the positional accuracy and forming accuracy of the duct element 6 are optimized in order to achieve accurately positioned latching of the duct elements 5, 6 to one another while achieving the desired sealing effect.

The connecting projections 9 additionally can have, on their ends facing the base wall 7, a section 21 that widens toward the inside and interacts with a V-shaped end 22 of the relevant connecting projection 13 in such a manner that the end 22 makes extensive contact with the end section 21 in the latched state.

Owing to the advantageous design of the air duct 3, easy installation of the air duct 3 is provided on the one hand, and great durability and sealing effect of the air duct 3 are ensured on the other hand. In particular, in accordance with the present exemplary embodiment, the result is achieved that two sealing regions 23 and 24 are produced between the mutually opposite side walls 10, 9, one in the region of the V-shaped end of the connecting projection 11 and one in the end region 21.

Figure 3:
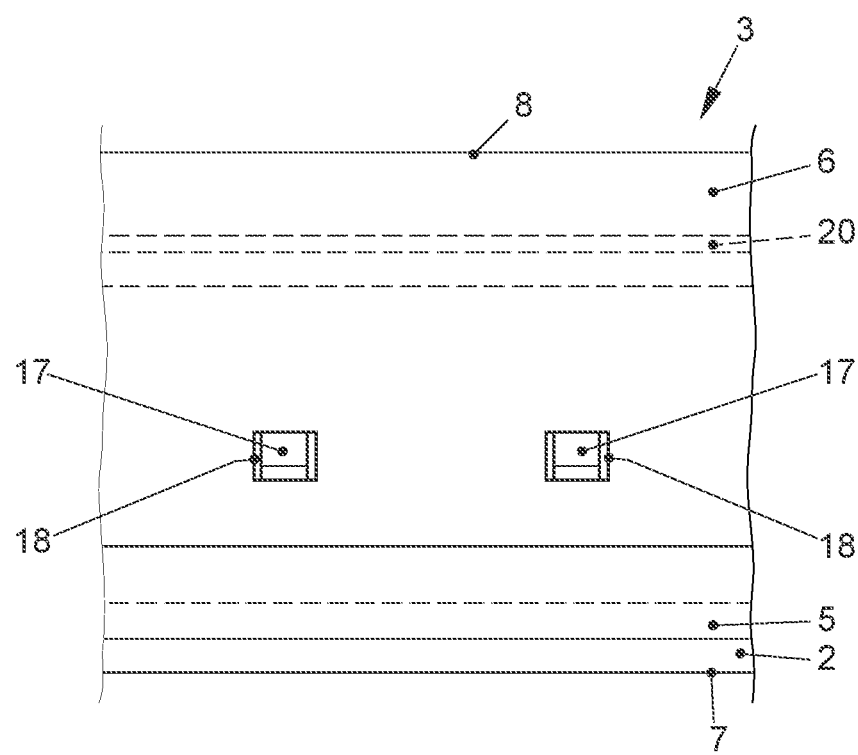
FIG. 3 is a side view of the air duct device.

FIG. 3 shows, in a simplified side view, the air duct 3 according to the exemplary embodiment from FIG. 2. Preferably, multiple latching lugs 17 are formed that are arranged to be spaced apart from one another when viewed in the longitudinal extent of the side walls 9, which lugs engage latching recesses 16 that are arranged to be spaced apart from one another correspondingly. Preferably a multiplicity of latching lugs 17 and latching recesses 16 that interact therewith are formed in the longitudinal extent of the air duct 3, in particular on both sides or on both side walls of the duct elements 5, 6 in order to ensure reliable and sealed locking of the duct elements 5, 6 along the longitudinal extent of the air duct 3.

Figure 4:
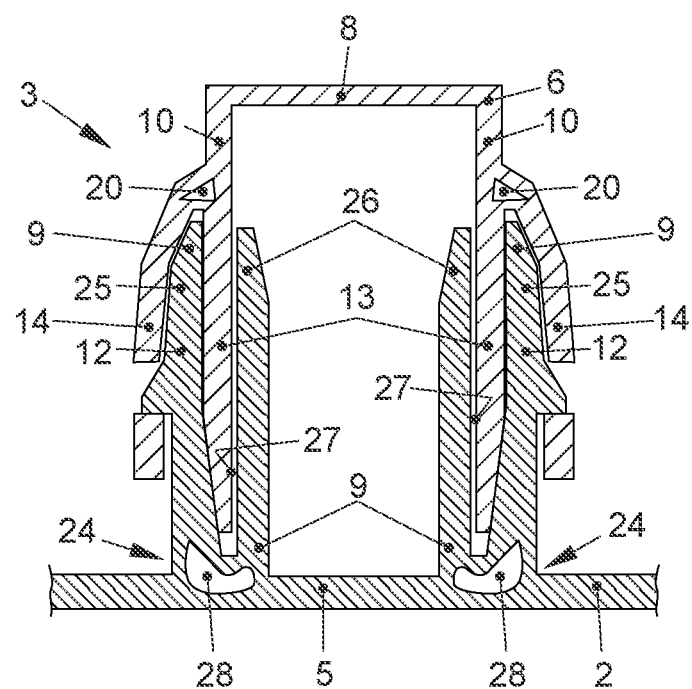
FIG. 4 is another exemplary embodiment of the air duct device in a cross-sectional representation of the air duct.

FIG. 4 shows another exemplary embodiment of the air duct 3 in another cross-sectional representation. Elements described from the preceding exemplary embodiment are labeled with the same reference symbols, so reference is made to the above description in this regard. Essentially only the differences are discussed below.

In contrast to the preceding exemplary embodiment, the side walls 9 of the duct element 5 now also have a forked branching into two connecting projections 25 and 26 that are at least essentially parallel to one another. Formed between the respective connecting projections 25, 26 is another receiving recess 27, which is designed to be complementary to the connecting projections 13 of the duct element 6 in such a manner that the connecting projections 13 are inserted into the receiving recesses 27. As a result, the sealing effect as well as the mechanical support between the duct elements 5, 6 is further improved.

Advantageously, an internal fluid injection pressure passage 28 that extends parallel to the air duct 8 or in the longitudinal extent thereof is formed in each of the branching regions 24 in order to also achieve here the advantages already described above with regard to the internal fluid injection pressure passages 20.

The result accomplished by the advantageous exemplary embodiments of the air duct 3 is that a great sealing effect or an advantageously closed design of the outer wall 4 viewed in cross-section, as well as easy installation and durable attachment of the duct elements 5, 6 to one another, are ensured, owing to an advantageous tongue and groove connection, which is achieved by the connecting projections 12, 13, 14, 25, and 26 and the receiving recesses 11 and 27 formed thereby.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An air duct device for a vehicle, the air duct device comprising:
    a tubular air duct having an outer wall that is closed in cross-section; and
    at least one elastically deformable latch associated with the air duct,
    wherein the air duct is designed in at least two parts in cross-section, including a first duct element and a second duct element which are held against one another in a sealing manner by the at least one latch such that together the first duct element and the second duct element form the closed outer wall of the air duct,
    wherein the first and/or the second duct element each have, in cross-section, a base wall and two side walls spaced apart from one another and projecting from the base wall, wherein each of the side walls has, on a free face thereof, either a receiving recess or a connecting projection,
    wherein each of the side walls of the first and/or the second duct element are forked into two of the connecting projections that are arranged at least essentially parallel to one another, wherein the two connecting projections of each side wall form a pair of connecting projections having the receiving recess between them, and
    wherein the first and/or the second duct element has an internal fluid injection pressure passage in a branching region of at least one of the side walls that is forked into the two connecting projections, the internal fluid injection pressure passage extending parallel to the air duct.

2. The air duct device according to claim 1, wherein the connecting projection of either the first or second duct elements is inserted into the receiving recess of the other of the first or second duct elements.

3. The air duct device according to claim 2, wherein at least one of the connecting projections of the first and/or the second duct element has a laterally projecting latching lug, and wherein the connecting projection of the other of the first duct element or the second duct element has a latching recess that interacts with the latching lug, the latching lug and the latching recess together forming the at least one latch.

4. The air duct device according to claim 3, wherein the latching lug and the latching recess are formed or arranged on an exterior of the air duct.

5. The air duct device according to claim 1, wherein both of the first duct element and the second duct element have the internal fluid injection pressure passage in each respective branching region.

6. The air duct device according to claim 2, wherein the connecting projection and/or the receiving recess of at least one of the first duct element or the second duct element has a V-shaped end for tight contact with the connecting projection and/or the receiving recess of the other of the first duct element or the second duct element.

7. The air duct device according to claim 1, wherein the first duct element or the second duct element is a support member of an instrument panel of a motor vehicle.

8. A motor vehicle comprising at least one air duct device according to claim 1.

9. An air duct device for a vehicle, the air duct device comprising:
    a tubular air duct having an outer wall that is closed in cross-section; and
    at least one elastically deformable latch associated with the air duct,
    wherein the air duct is designed in at least two parts in cross-section, including a first duct element and a second duct element which are held against one another in a sealing manner by the at least one latch such that together the first duct element and the second duct element form the closed outer wall of the air duct,
    wherein the first duct element has a receiving recess and the second duct element has a first connecting projection that is inserted into the receiving recess,
    wherein the receiving recess of the first duct element has a V-shape for tight contact with the first connecting projection of the second duct element.

10. The air duct device according to claim 9, wherein the first duct element and the second duct element each have, in cross-section, a base wall and two side walls spaced apart from one another that each project from the base wall, wherein each of the side walls of the first duct element has a respective one of the receiving recess and each of the side walls of the second duct element form a respective one of the first connecting projection, wherein an end of the first connecting projection of the second duct element that merges with the base wall is wider than a distal end thereof.

11. The air duct device according to claim 10, wherein the distal end of the first connecting projection of the second duct element tapers into a V-shape that is complementary to the V-shape of the receiving recess of the first duct element into which the first connecting projection is inserted.

12. The air duct according to claim 10, wherein each of the side walls of the first duct element is forked into two second connecting projections having the receiving recess therebetween, wherein a distal end of one of the two second connecting projections of each side wall is tapered, wherein the tapered distal end contacts the widened end of the first connecting projection of the second duct element.

* * * * *